(12) United States Patent
Nastasia

(10) Patent No.: US 6,183,982 B1
(45) Date of Patent: Feb. 6, 2001

(54) FERMENTATION BUNG DEVICE AND METHOD

(75) Inventor: Martin Nastasia, Lodi, CA (US)

(73) Assignee: Ferm-Rite, Inc., Lodi, CA (US)

( * ) Notice: Under 35 U.S.C. 154(b), the term of this patent shall be extended for 0 days.

(21) Appl. No.: 09/032,358

(22) Filed: Feb. 27, 1998

(51) Int. Cl.$^7$ .................................................. C12P 1/00
(52) U.S. Cl. ...................... 435/41; 435/93; 435/283.1; 217/110; 217/270; 215/355; 215/364; 220/307; 426/592
(58) Field of Search ............................... 217/110; 215/270, 215/355, 364; 220/307; 435/41, 93, 283.1, 289.1, 291.1; 426/592

(56) References Cited

U.S. PATENT DOCUMENTS

| | | | |
|---|---|---|---|
| 848,463 | * | 3/1907 | Hearn . |
| 4,826,029 | * | 5/1989 | Skoglie . |
| 5,649,859 | * | 7/1997 | Shiga . |

FOREIGN PATENT DOCUMENTS

2128967 * 5/1984 (GB) .

* cited by examiner

*Primary Examiner*—David A. Redding
(74) *Attorney, Agent, or Firm*—Gray Cary Ware & Freidenrich, LLP

(57) ABSTRACT

A fermentation device and a method for making a substance using the device are provided. The fermentation bung may have an outer plug that includes a central inner annular hole and a one or more holes surrounding the central hole, the outer plug fitting within a bung hole in a barrel in which a substance is going to be fermented. The device may further include an inner plug with a centrally extending stem that frictionally fits into the central inner annual hole of the outer plug to secure the inner plug into the outer plug and also have a top portion which covers the one or more holes surrounding the central hole. During the fermentation of the substance, the gases produced during fermentation may be vented through the device since the top portion of the inner plug may flex slightly to permit the escape of the gas. However, the device prevents any ambient air from entering the barrel since the top portion of the inner plug is covering the one or more holes.

14 Claims, 4 Drawing Sheets

FERMENTATION BUNG DEVICE AND METHOD

BACKGROUND OF THE INVENTION

This invention relates generally to a device and method for controlling a fermentation process of a substance and in particular to a device and method which controls the air and gases entering and exiting a barrel during the fermentation process.

During the wine making process, there is a primary fermentation process, a secondary fermentation process and a storage process. During each of the fermentation processes, carbon dioxide gas is generated as a result of the fermentation of the wine. The second fermentation process is performed after the wine has been placed in a wine casket or barrel and the generation of carbon dioxide has slowed down as compared to the primary fermentation process because an anaerobic fermentation process occurs. During the secondary fermentation process, it is desirable to perform the fermentation without oxygen since oxidation is detrimental to that process. In addition, it is necessary to prevent contaminants from entering the wine barrel during the fermentation since the contaminants may affect the quality of the wine produced. Thus, it is desirable to prevent ambient air and possible contaminants within the ambient air from entering the wine making cask or barrel during the secondary fermentation process.

As described above, during the fermentation process, carbon dioxide gas is generated by the fermentation and it is necessary to vent this carbon dioxide out to the surrounding environment so that the wine barrel or cask does not explode due to the pressure created by the carbon dioxide gas. Thus, it is desirable to provide a device which permits the carbon dioxide gases to escape from the wine barrel while still keeping ambient air and other contaminants our of the wine barrel.

In a typical wine making process, a conventional fermentation bung may be inserted into a hole in the wine barrel to permit fermentation gases to escape from the wine barrel. Then, once the fermentation process is complete, the wine must be stored in the wine barrel for some predetermined amount of time to age the wine. Typically, the fermentation bung is removed from the wine barrel and a solid plug is put into the wine barrel to seal the barrel until the storage time is completed. It is desirable to be able to use a single wine making device which can be used both during the fermentation process to vent fermentation gas as well as seal the wine barrel during the long storage period.

One conventional wine fermentation apparatus permits excess carbon dioxide gas to escape from a first chamber into a second chamber, prevents ambient air from entering the first chamber and puts any additional fluid into the wine barrel. This apparatus, however, is manufactured out of several glass pieces which may be easily broken or damaged. In addition, this apparatus would be expensive to manufacture. In addition, the apparatus may exhaust fermentation gases, but cannot be used for the long term storage of the wine since the fragile pieces of the apparatus might be broken during transport.

Another conventional device is a stopper for a wine barrel in which the stopper has a outer plug which fits into a hole in a wine barrel. The device may also have an inner plug that fits tightly within an hole in the outer plug. The stopper device permits the wine barrel to be stoppered at appropriate times, but also permits a person to remove the inner plug so that various processes may be performed on the wine in the wine barrel, such as the sampling the wine or the releasing of fermentation gases. This stopper device seals the wine barrel, but does not permit fermentation gases to escape without removing the inner plug. In addition, although a device for permitting fermentation gas to escape and for preventing ambient air from entering the wine barrel are disclosed, this additional device must be inserted into the hole left when the inner plug is removed so that, for some period of time, ambient air may enter into the wine barrel. Thus, this conventional stopper apparatus does not provide a single device which seals the wine barrel during storage, permits fermentation gases to escape from the wine barrel and prevents ambient air from entering the wine barrel during fermentation.

Another conventional container closure device permits built up gases to escape from a container while preventing ambient air from entering the container. This device, however, has a complex construction which makes it difficult and expensive to manufacture.

Thus, it is desirable to provide a wine making device which has a simple construction and is inexpensive. The wine making device should permit fermentation gases to escape while preventing ambient air from entering the wine barrel during fermentation and, once the fermentation process is complete, seal the wine barrel during the storage time. In addition, it is also desirable to provide a fermentation bung which may be used for a variety of substances that are generated with a fermentation process, such as other alcohol beverages and pharmaceuticals.

SUMMARY OF THE INVENTION

A wine making device and a method for making wine using the device are provided. The wine making device may have an outer plug that includes a central inner annular hole and a one or more holes surrounding the central hole and fits within a bung hole in a wine casket. The device may further include an inner plug with a centrally extending stem that frictionally fits into the central inner annual hole of the outer plug to secure the inner plug into the outer plug. The inner plug also has a top portion which covers the one or more holes surrounding the central hole. During the fermentation of the wine, the gases produced during fermentation, such as carbon dioxide, may be vented through the device because the top portion of the inner plug may flex slightly to permit the escape of the gas. However, the device prevents any ambient air from entering the wine barrel since the top portion of the inner plug is covering the one or more holes. After the fermentation process has been completed, the wine making device may also effectively seal the wine barrel during the storage period.

In another embodiment of the invention, a wine making device, as described above, is provided which further includes a thicker stem portion of the inner plug to more tightly fit within the annual hole in the outer plug. This thicker stem improves the ability of the wine making device to permit carbon dioxide to escape a wine barrel while preventing ambient air from entering the wine barrel. In another embodiment, the wine making device may further include one or more ridges on the stem of the inner plug so that the inner plug may be pushed down into the wine barrel at various different distances during the fermentation process and storage process so that the wine making device may be used for both the fermentation process as well as to seal the wine barrel during the storage.

The top portion attached to the stem, when not inserted into outer plug, may be concave so that as the stem is inserted into the outer plug, the periphery of the top portion touches the outside of the outer plug first. Then, as the stem is inserted farther into the outer plug, the top portion becomes pressed against the outer plug by a down force. The fermentation bung may also be used with any other substances, such as any type of alcoholic beverages or pharmaceuticals, which require a fermentation process to produce the substance.

Thus, in accordance with the invention, a device that fits within a bung hole of a barrel during the production of a substance, such as wine, which requires fermentation is provided. The fermentation device comprises an outer plug that fits into the bung hole of the barrel containing the substance, the outer plug comprising a central hole and one or more vent holes located around the periphery of the outer plug and an inner plug having a stem portion and a cap portion, the stem portion of the inner plug being inserted into the central hole of the outer plug and the cap portion of the inner plug resting on top of the vent holes of the outer plug so that air is prevented from entering the barrel while fermentation gases may escape through the vent holes.

A method of making a substance requiring fermentation is also provided. The method comprises pouring the substance into a barrel, and fermenting the substance within the barrel, the barrel including a fermentation bung having an outer plug that fits into the bung hole of the wine barrel, the outer plug comprising a central hole and one or more vent holes located around the periphery of the outer plug, and an inner plug having a stem portion and a cap portion, the stem portion of the inner plug being inserted into the central hole of the outer plug and the cap portion of the inner plug resting on top of the vent holes of the outer plug so that air is prevented from entering the barrel while fermentation gases may escape through the vent holes. In addition, a wine produced using the wine making device is also provided.

DETAILED DESCRIPTION OF A PREFERRED EMBODIMENT

The invention is particularly applicable to a method and device for making a wine and it is in this context that the invention will be described. It will be appreciated, however, that the system and method in accordance with the invention has greater utility, such as other substances, such as other alcoholic beverages or pharmaceuticals, which require fermentation to occur. For example, the fermentation bung in accordance with the invention may be used for making vodka.

Figure 1:
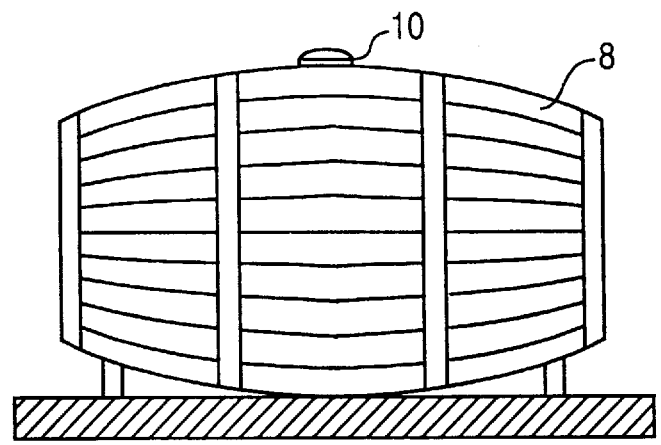
FIG. 1 is a diagram illustrating a fermentation bung in accordance with the invention inserted into a wine barrel.

FIG. 1 is a diagram illustrating a wine barrel 8 which has a wine making device 10 in accordance with the invention inserted into a hole in the wine barrel. The wine making device in accordance with the invention may be referred to as a fermentation bung and the hole in the wine barrel may be referred to as a bung hole. During the process of producing wine, the wine is placed into wine barrels and goes through a fermentation process during which fermentation gases, such as carbon dioxide, are produced. The fermentation bung, as described below, permits fermentation gases to escape from the wine barrel while preventing ambient air and contaminants from entering the wine barrel during the fermentation process. Once the fermentation process has been completed and no more carbon dioxide is being produced, the wine barrel is sealed and stored for a period of time.

In a typical wine making process, a conventional fermentation bung must be replaced with a solid plug for the storage period. However, with the fermentation bung in accordance with the invention, as described below, it may also function to seal the wine barrel during the storage time. In particular, during the storage time, the wine in a barrel seeps into the wood of the barrel and creates a vacuum within the barrel which holds the fermentation bung in accordance with the invention into the wine barrel during storage. Thus, the fermentation bung in accordance with the invention may be utilized both during the fermentation process and during the storage time and performs the functions necessary for both of these processes. Now, the details of the fermentation bung in accordance with the invention will be described.

Figure 2:
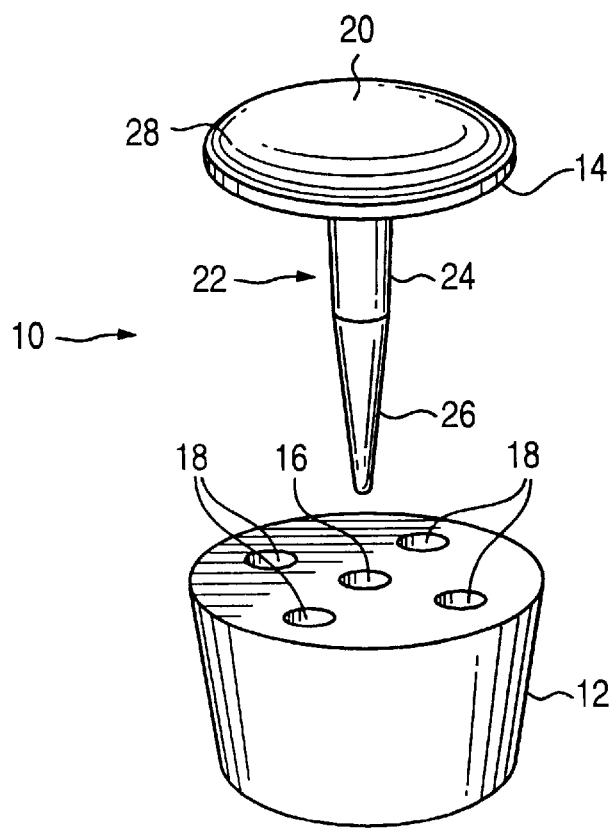
FIG. 2 is a diagram illustrating a perspective view of a wine making device in accordance with the invention.

FIG. 2 is a perspective view of a wine making device 10 in accordance with the invention which may include a outer annular shaped plug 12 and an inner plug 14 wherein the outer annular shaped plug 12 may fit tightly into a bung hole of a wine casket or barrel. The outer plug 12 and the inner plug 14 may both be manufactured out of any material which may be used in connection with food, such as a food grade silicon rubber. For example, the material may be a 30 grade silicon rubber made by General Electric.

The outer annular plug 12 may include a central annular hole 16 and one or more vent holes 18 located around the periphery of the outer plug. In the example shown, the outer plug has four vent holes, but the invention is not limited to any particular number of vent holes. The diameter of the central annular hole is approximately ⅜". The vent holes may be of any diameter. The outer plug 12 may also include a ridge 19 around the periphery of the outer plug.

The inner plug 14 may further include a cap portion 20 which is connected to a stem portion 22. The cap portion, in the example shown, may be circular shaped so that the cap portion completely covers the vent holes 18 of the outer plug 12 when the inner plug is inserted into the outer plug, as described below. As described above, the cap portion and stem portion may be manufactured out of food grade silicon rubber. The stem portion 22 may further comprise an upper cylindrical portion 24 which is attached to the cap portion 20 and a lower conical portion 26 which is attached to the upper cylindrical portion. The upper portion 24, which frictionally fits into the central hole 16 of the outer plug 12, may have a diameter of approximately 7/16" which is 1/16" larger than the diameter of the central hole 16. The invention, however, is not limited to any particular diameter of either the upper portion 24 or the central hole 16 as long as diameter of the upper portion 24 is slightly larger than the diameter of the central hole 16. The slight difference between the diameters of these two portions permit the inner plug 14, once inserted into the outer plug 12, to be tightly held within the central hole 16 by frictional force.

In operation, the outer plug 12 is inserted into a wine barrel. Next, the inner plug 14 is inserted into the outer plug 12 and is frictionally held in the outer plug since the diameter of the stem portion 22 is large enough to provide a sufficient frictional force to hold to the inner plug within the outer plug. Once the inner plug has been seated within the outer plug, the central hole of the outer plug has been filled with the stem portion 22 and the vent holes 18 of the outer plug are covered by the cap portion 20 of the inner plug 14 so that no air can enter the wine barrel through the fermentation bung in accordance with the invention. However, when a sufficient amount of fermentation gas has been generated within the wine barrel, the pressure of the fermentation gas forces a periphery 28 of the cap portion 20 to deflect slightly which permits the fermentation gases to escape. Once the fermentation gases have escaped, however, the cap portion again covers the vent holes and prevents any air from the atmosphere from entering into the wine barrel.

Figure 3:
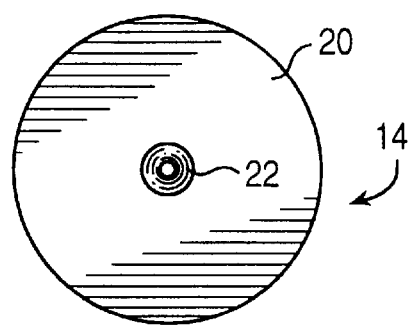
FIG. 3 is a bottom view of the inner plug portion of the wine making device in accordance with the invention.
Figure 4:
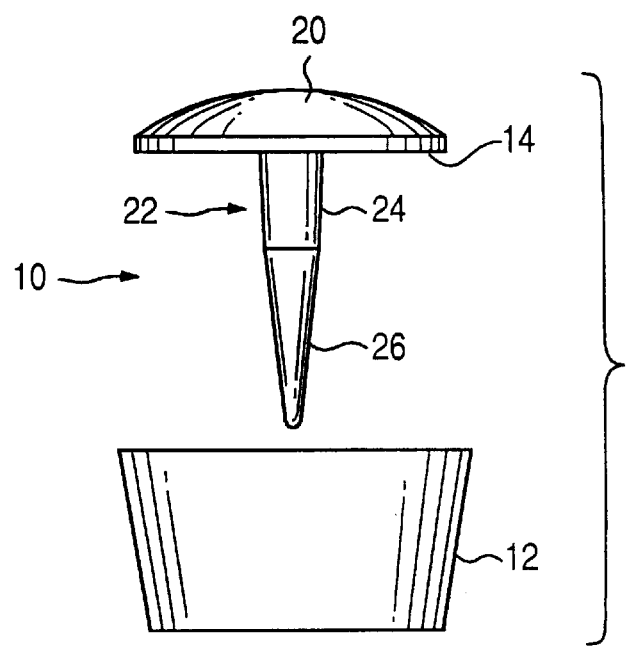
FIG. 4 is a diagram illustrating a side view of the wine making device in accordance with the invention.
Figure 5:
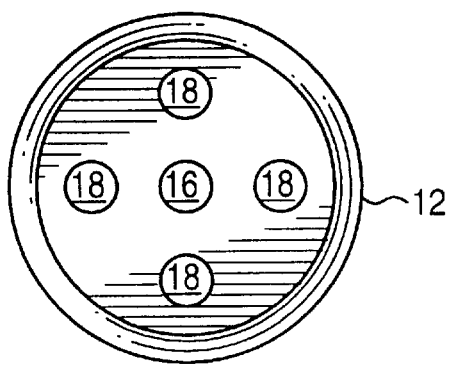
FIG. 5 is a top view of the outer plug of the wine making device.

FIGS. 3–5 illustrate other details of the fermentation bung 10 in accordance with the invention. For example, FIG. 3 shows a bottom view of the cap portion 20 and the stem 22. As shown, the cap portion 20 may have a concave shape so that the periphery 28 of the cap portion 20 contacts the outer plug 12 first. Additional details about the shape of the cap portion 20 and interaction between the cap portion 20 and the outer plug 12 will be described below with reference to FIGS. 6a–6c. FIG. 4 is a side view of the fermentation bung 10 in accordance with the invention. FIG. 5 is a top view of the outer plug 12 showing the ridge 19 along the periphery of the outer plug 12. The interaction between the ridge 19, the cap portion 20 and the outer plug 12 will now be described with reference to FIGS. 6a–6c.

Figure 6A:
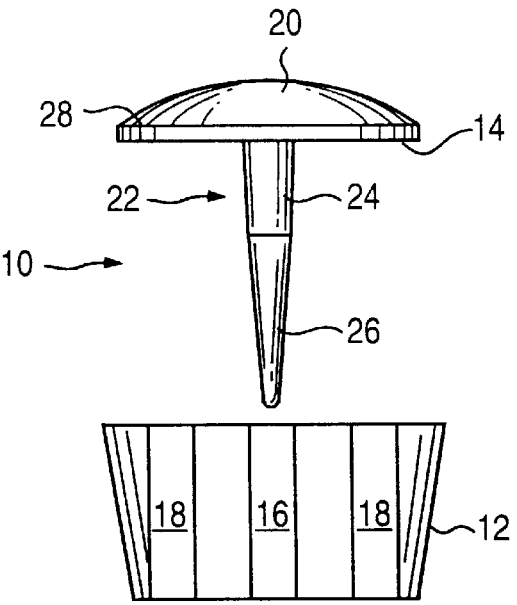
FIGS. 6a–6c are diagrams illustrating an inner plug of the fermentation bung in accordance with the invention being inserted into the outer plug.
Figure 6B:
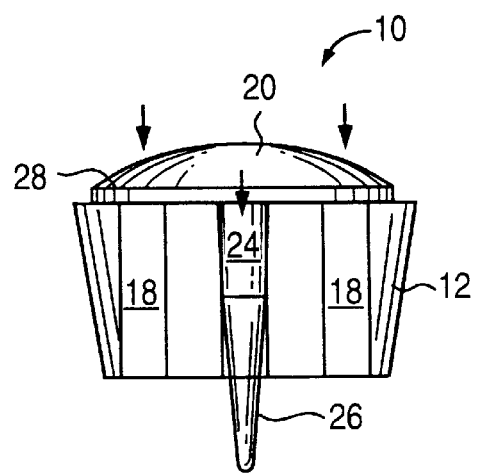
Figure 6C:
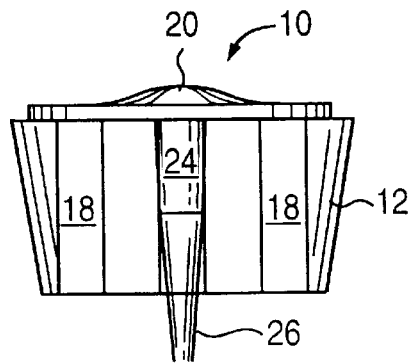

FIGS. 6a, 6b and 6c are diagrams illustrating a cross sectional view of the outer plug 12 and the inner plug 14 when the inner plug has not been inserted into the outer plug, when the periphery of the cap portion contacts the outer plug, and when the inner plug is completed seated on the outer plug, respectively. As shown in FIG. 6a, when the inner plug 14 has not been inserted into the outer plug, the cap portion has a concave umbrella shape in that the periphery 28 of the cap portion are closer to the outer plug than other portions of the cap portion. Thus, the cap portion has a concave shape when not inserted into the outer plug.

FIG. 6b illustrates the inner plug 14 and outer plug 12 when the inner plug has been inserted into the outer plug and the periphery 28 of the cap portion has contacted the outer plug 12 and in particular, the ridge 19. As shown by the arrows, as the stem 22 of the inner plug is inserted farther into the outer plug's central hole 16, the concave portions of the cap portion flattens out and cover the outer plug which causes the periphery of the cap portion to move outwards towards the ridge 19. Thus, as the inner plug is inserted farther into the outer plug, the flattening out of the concave portions of the cap portion apply a down force to securely hold the cap portion tightly against the outer plug's upper surface to prevent air or contaminants from entering the wine barrel through the vent holes of the fermentation bung.

FIG. 6c shows the inner plug 14 fully inserted into the outer plug 12 such that the concave portions of the cap portion are flat against the upper surface of the outer plug. However, when any fermentation gas is produced during the fermentation process, as shown by the dotted lines, the fermentation gas may escape from the wine barrel. Once the fermentation gas has been released, the resilient silicon rubber of the cap portion reseats itself, due to the down force, on top of the vent holes so that no air may enter the wine barrel.

As the fermentation process is completed, no more fermentation gas is produced and the wine barrel is sealed for storage to let the wine age. In a typical wine making process, the bung used for the fermentation process must be replaced with a solid plug for the storage time. However, in accordance with the invention, the fermentation bung may be used during both the fermentation process as well as the storage process. As described above, during the fermentation process, the fermentation bung in accordance with the invention may permit the fermentation gases to escape from the wine barrel while preventing air or contaminants from entering the wine barrel. Then, without having to remove the fermentation bung so that no air ever needs to be introduced into the wine barrel, the fermentation bung also functions to seal the wine barrel during storage. In particular, during the storage time, the wine in the wine barrel seeps into the wood of the walls of the wine barrel which creates a vacuum in the wine barrel. This vacuum in the wine barrel pulls the fermentation bung in accordance with the invention, and the inner plug in particular, into the wine barrel so that the inner plug and outer plug are more firmly seated in the hole of the wine barrel which effectively seals the wine barrel during storage. The vacuum created also prevents the cap portion of the inner plug from being moved since the vacuum is also applied to the cap portion through the vent holes of the outer plug. Thus, the fermentation bung in accordance with the invention may perform the required functions for both the fermentation process as well as the storage process. Now, a second embodiment of the fermentation bung will be described.

Figure 7:
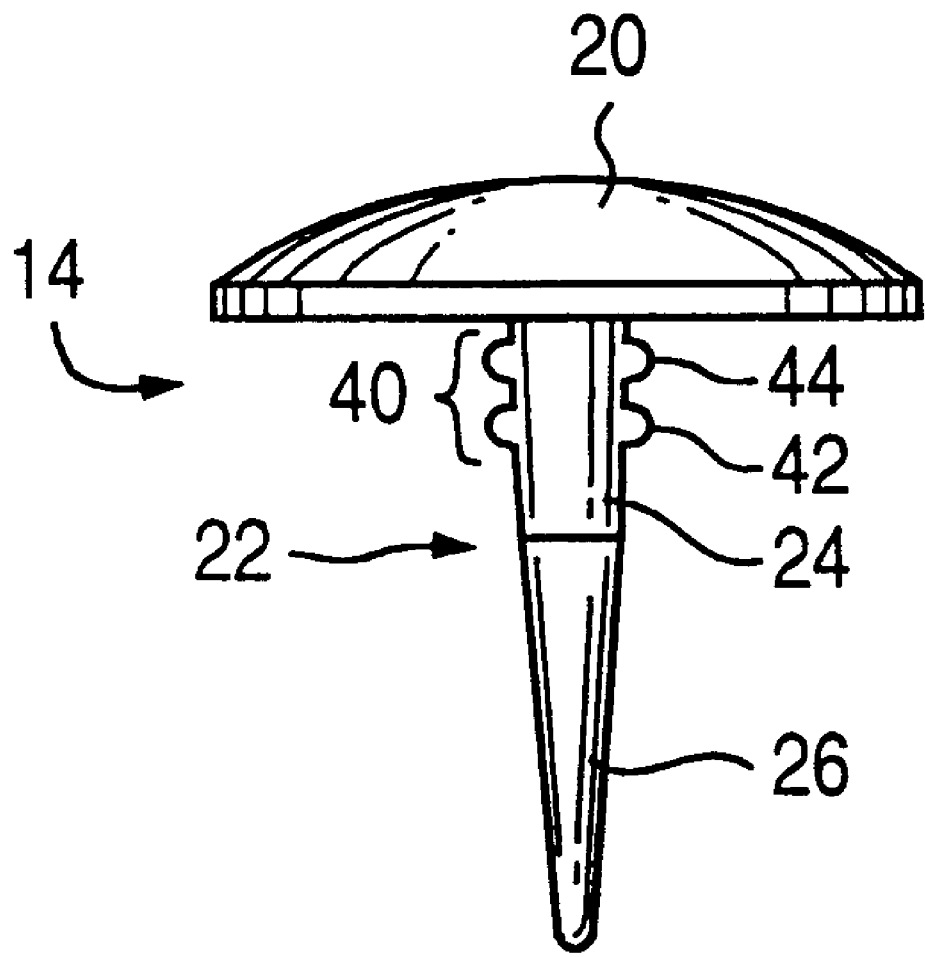
FIG. 7 is a diagram illustrating a second embodiment of the fermentation bung in accordance with the invention.

FIG. 7 is a diagram illustrating a second embodiment of the fermentation bung in accordance with the invention wherein the inner plug 14 may have one or more ridges 40 on the upper portion 24 of the stem 22. In general, these ridges may help hold the stem within the central hole 16 of the outer plug 12. In addition, each ridge may permit the inner plug to be inserted into the outer plug at different depths. For example, at a first ridge 42 corresponding to a first depth, the down force on the cap portion is sufficient to keep air out of the vent holes, but permit fermentation gases to escape. Thus, this position may be used during the fermentation process. Then, during the storage time, the inner plug may be moved down to a second ridge 44 in which the inner plug is inserted farther into the outer plug and the down force on the cap portion is greater which helps to seal the wine barrel during the storage time. In addition, as described above, the sealing of the wine barrel is also aided by the vacuum created in the wine barrel. Thus, the ridges on the stem permit the inner plug to be inserted into the outer plug at different depths so that the fermentation bung may serve slightly different purposes.

Although the fermentation bung has been described in the context of a wine making process, the fermentation bung in accordance with the invention may also be utilized in any other process which produces a substance which requires a fermentation step. For example, the fermentation bung may also be used with a vodka making process or a pharmaceutical making process.

While the foregoing has been with reference to a particular embodiment of the invention directed to wine making, it will be appreciated by those skilled in the art that changes in this embodiment may be made without departing from the principles and spirit of the invention, the scope of which is defined by the appended claims.

What is claimed is:

1. A device that fits within a bung hole of a barrel containing a substance that is going to be fermented, the device comprising:

an outer plug that fits into the bung hole of the barrel, the outer plug comprising a central mounting hole and one or more vent holes arranged around the central mounting hole; and an inner plug having a stem portion and a cap portion connected to each other, the stem portion of the inner plug being inserted into the central mounting hole of the outer plug and the cap portion of the inner plug resting on top of the vent holes of the outer plug so that air is prevented from entering the barrel although gases produced during fermentation escape from the barrel through the vent holes.

2. The device of claim 1, wherein the cap portion of the inner plug has a concave shape so that, as the inner plug is pulled into the outer plug, the concave shape of the inner plug is flattened out to exert more pressure on the vent holes to ensure that air is prevented from entering the barrel.

3. The device of claim 1, wherein the diameter of the stem portion of the inner plug is greater than the diameter of the central mounting hole of the outer plug so that the inner plug and outer plug are frictionally connected together.

4. The device of claim 1, wherein the stem portion of the inner plug further comprises one or more ridges on the periphery of the stem portion so that the position of the stem portion within the outer plug may be adjusted in a stepwise manner.

5. The device of claim 4, wherein the inner plug is located at a first position based on the ridges in order to ferment the substance in the barrel and is located at a second position closer to the outer plug based on the ridges in order to seal the barrel during storage.

6. The device of claim 1, wherein the inner plug seals the barrel during storage because the vacuum generated in the barrel as the substance in the barrel seeps into the barrel causes the outer and inner plugs to be pressed more firmly into the barrel.

7. The device of claim 1, wherein the inner and outer plugs are manufactured from silicon rubber.

8. The device of claim 1, wherein the cap portion further comprises a thick circular central portion connected to the stem portion and a thin circular periphery portion connected to the thick circular central portion, the periphery portion flexing upwards when fermentation gases are escaping from the barrel.

9. The device of claim 8, wherein the barrel is constructed to be capable of fermenting one of an alcoholic beverage and a pharmaceutical.

10. The device of claim 9, wherein the alcoholic beverage comprises wine.

11. A method of making a substance that ferments while it is located within a barrel, the method comprising:

pouring the substance into a barrel; and placing a fermentation device into the bung hole in the barrel, the fermentation device comprising an outer plug that fits into the bung hole of the barrel, the outer plug further comprising a central hole and one or more vent holes arranged around the central hole, and an inner plug having a stem portion and a cap portion, the stem portion of the inner plug being inserted into the central hole of the outer plug and the cap portion of the inner plug resting on top of the vent holes of the outer plug so that air is prevented from entering the barrel while fermentation gases may escape through the vent holes; and fermenting the substance within the barrel including removing the gases generated during the fermentation from the barrel through the vent holes of the fermentation device.

12. The method of claim 11 further comprising storing the substance within the barrel once the fermentation has been completed, the substance in the barrel seeping into the barrel and creating a vacuum within the barrel and further comprising pulling the fermentation device more tightly into the bung hole of the barrel due to the vacuum within the barrel so that the fermentation device is used for both the fermentation and storage of the substance.

13. The device of claim 12, wherein the fermented substance comprises one of an alcoholic beverage and a pharmaceutical.

14. The device of claim 13, wherein the alcoholic beverage comprises wine.

* * * * *